No. 689,157. Patented Dec. 17, 1901.
H. G. BERSTORFF & E. A. H. MEYER.
RUBBER BALL AND PROCESS OF MANUFACTURING SAME.
(Application filed July 10, 1901.)

(No Model.) 2 Sheets—Sheet 1.

Witnesses
Inventors
Hermann G. Berstorff
Edward A. H. Meyer
by James L. Norris
atty

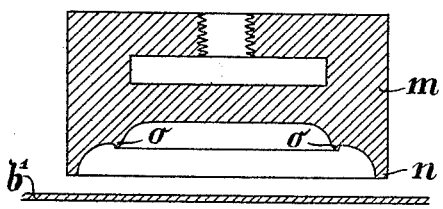
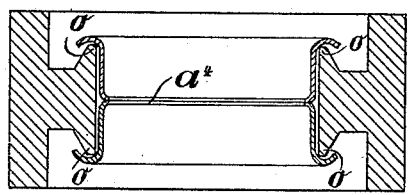
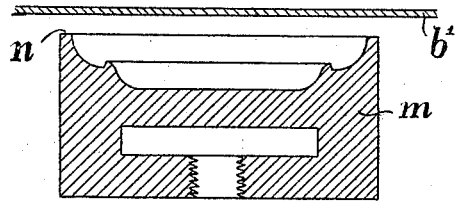
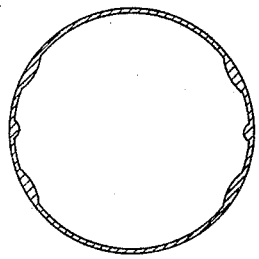
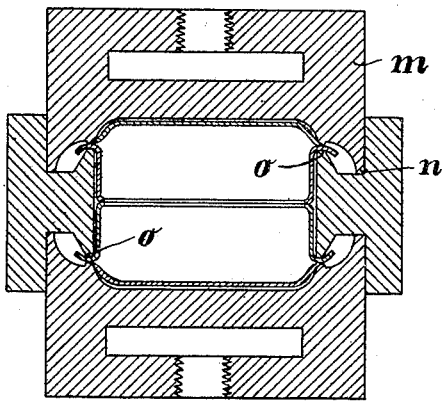

UNITED STATES PATENT OFFICE.

HERMANN GUSTAV BERSTORFF AND EDUARD ADOLF HERMANN MEYER, OF HANOVER, GERMANY.

RUBBER BALL AND PROCESS OF MANUFACTURING SAME.

SPECIFICATION forming part of Letters Patent No. 689,157, dated December 17, 1901.

Application filed July 10, 1901. Serial No. 67,732. (No model.)

*To all whom it may concern:*

Be it known that we, HERMANN GUSTAV BERSTORFF, engineer, and EDUARD ADOLF HERMANN MEYER, engineer, subjects of the King of Prussia, Emperor of Germany, residing at Hanover, Province of Hanover, in the Kingdom of Prussia, Germany, have invented certain new and useful Improvements in Rubber Balls and Processes of Manufacturing the Same, of which the following is a specification.

In the method of making rubber balls by machinery hitherto adopted two slightly-saucer-shaped domed or arched rubber plates are connected or united at the edges and then expanded into balls in a mold under the pressure of a gas inside the ball, the rubber being at the same time vulcanized.

Figure 1:
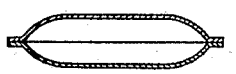
Figure 2:
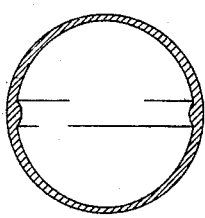
Figure 3:
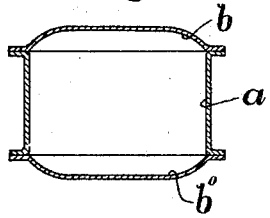
Figure 4:
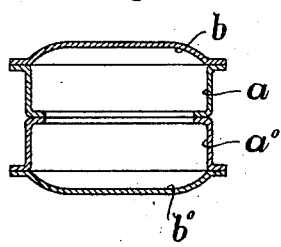
Figure 5:
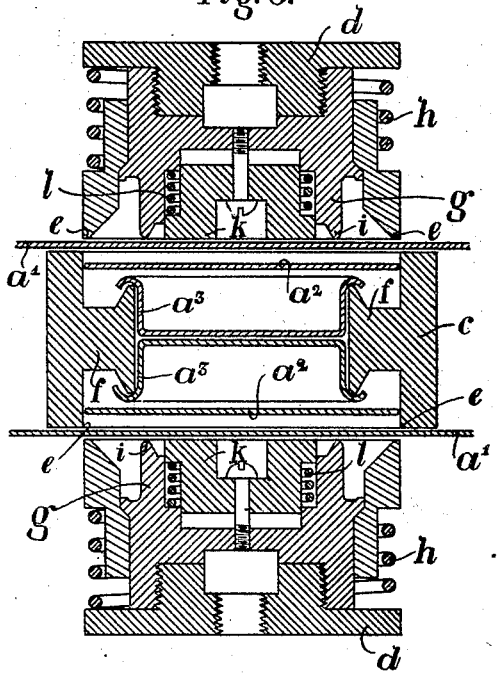
Figure 6:
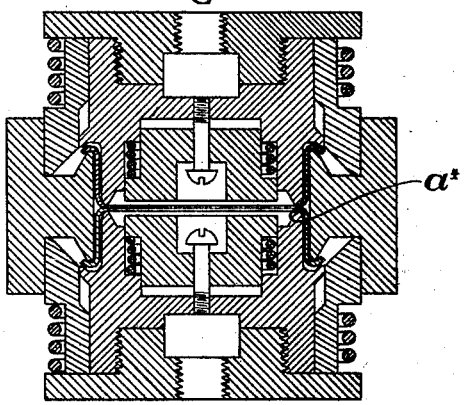

In the accompanying drawings, Figure 1 shows a section of the unexpanded ball; Fig. 2, of an expanded rubber ball; Fig. 3, an elevation of the improved ball made from a cylindrical casing, and Fig. 4 another form of the same. Fig. 5 is a view of the matrix employed for making the balls, while Figs. 6, 7, and 8 are other views of the machinery. Fig. 9 shows a section of a finished ball made by this improved process.

The balls produced by the old process have always a considerably-greater thickness of wall in proximity to the joint or place where the two halves are united than at the poles belonging to these two parts, (see Fig. 2,) and this unequal distribution of the material results in more or less considerable departures from the spherical form. Further, it is not possible to produce balls of larger diameter by the machinery employed in this process.

The present invention has for its object a process which differs from the one previously mentioned by the balls not being made of two spherical cups, but of a cylindrical casing $a$, Fig. 3, and of two flat or saucer-shaped ends $b\ b^0$. Such a body approximates from the first nearer to a spherical form, and when inflated later no parts exist requiring so strong an expansion as the previously-mentioned poles in the earlier processes.

For carrying out this improved process the arrangement shown in Figs. 5 to 8 may be employed. This arrangement produces the cylindrical part of the raw ball with a view to more convenient method of manufacture and to the circumstance that both ends of the cylinder, as will be seen farther on, are provided with outside flanges, the said cylinder being formed of two separate cylindrical parts $a\ a^0$, Fig. 4, each of half the height of the complete cylinder and connected by internal flanges with one another.

The apparatus consists of a mold or matrix which is so formed that a pressure stamp or die can enter it from two opposite sides. Any suitable kind of press by which the necessary pressure can be obtained may be adopted. It is only a question here of the form of the matrix and the die.

Fig. 5 shows the matrix $c$ with two similar dies $d$ situated outside. On each side of the matrix a rubber plate $a'$ is placed, and then the depression of the dies takes place. The edges $e$ first cut out of each rubber plate a circular disk, which is indicated by $a^2$ in Fig. 5. Then it is pressed into the form indicated by $a^3$, the cylindrical part $g$ of the pistons entering the inner cylinder of the matrix. When the edges $e$ encounter the annular bottom $f$ of the matrix, the center part of the die $g$ still descends, which center part is held up against the outer part by springs $h$, so that the disks now assume a cup-shaped form $a^3$ and in such a way that the bottoms of both cups meet. Then the edges $i$ of the parts $g$ of the die, which are again in turn supported against the centermost part $k$ by a spring $l$, press further inward. These edges are beveled to the outside to meet one another with their inner cutting edges and cut off or nick the double bottom of the rubber cylinder $a^3$ in such a way that two narrow inwardly-projecting flanges (see $a^4$, Figs. 6 and 7) remain standing, which are at the same time combined with one another by the pressure. If the dies are then withdrawn from the matrix, there remains in the latter a cylindrical-shaped piece provided at the edges with outside flanges, which piece consists, in the manner hereinbefore explained, of two separate cylinders $a\ a^0$ connected with one another by internal flanges, as shown in Fig. 4. The rubber plate $b'$, Fig. 7, is then laid from each side on the matrix, and the two stamps or dies $m$ are inserted or introduced. The outer edges $n$ first again cut circular disks out of the rubber plates and then the plates in consequence of the form of the stamp and the air inclosed in the hollow bodies assume the form shown in Fig. 8, and finally the inner edges $o$ of the matrix and of the die unite the outer flanges by pressure, so that the body shown in Fig. 4 results. The further treatment (vulcanizing) is effected in the ordinary manner. The bicarbonate of ammonia necessary for inflating the ball may be introduced into the hollow body (on the under plate $b'$) before the pressing process shown in Fig. 7. By simultaneously making use of several matrices and dies the arrangement may be such that several balls are made at once, while the number and size are defined by the width of the rubber plate employed.

Balls of almost any desired size may be produced by this process, which apart from the joints or points of connection exhibit an even thickness of walls, and thereby also retain their spherical wall. Fig. 9 shows a cross-section of such a ball. The crude balls thus made may in consequence of the gas or air contained in them be tested by simple pressure to see whether they are air-tight, and therefore suitable for vulcanization. Instead of ordinary rubber balls of course other like hollow bodies may be produced in a similar manner.

We declare that what we claim is—

1. A rubber ball or the like made from a cylindrical central part and end pieces secured to the ends of said cylindrical part, the whole being inflated into spherical form.

2. The process of making rubber balls and other like hollow bodies, which consists in securing end pieces to the ends of a cylindrical part and inflating the hollow body thus formed.

3. The process of making rubber balls and other like hollow bodies, which consists in forming a central cylindrical part of the two parts $a$ and $o^0$, connected together by internal flanges, securing end pieces $b$ to the ends of said cylindrical part, and inflating the hollow body thus formed.

4. The process of making rubber balls and other like hollow bodies, which consists in forming a central cylindrical part by pressing into cup-shape form two disks, connecting said disks together at their bases and cutting away the central portion of said bases to form inwardly-extending flanges, afterward securing end pieces to the ends of said cylindrical part and finally inflating the hollow body thus formed.

In testimony whereof we have hereunto set our hands in presence of two subscribing witnesses.

HERMANN GUSTAV BERSTORFF.
EDUARD ADOLF HERMANN MEYER.

Witnesses:
LEONORE KARCH,
C. C. STEVENSON.